(No Model.)

C. W. WERNER.
ATTACHMENT FOR FLOWER POTS.

No. 592,556. Patented Oct. 26, 1897.

WITNESSES:
A. N. Romney
C. G. Graydon

INVENTOR:
Carl W. Werner,
By his Attorney,
Henry W. Williams

THE NORRIS PETERS CO., PHOTO-LITHO., WASHINGTON, D. C.

UNITED STATES PATENT OFFICE.

CARL W. WERNER, OF WAKEFIELD, MASSACHUSETTS.

ATTACHMENT FOR FLOWER-POTS.

SPECIFICATION forming part of Letters Patent No. 592,556, dated October 26, 1897.

Application filed May 1, 1897. Serial No. 634,721. (No model.)

*To all whom it may concern:*

Be it known that I, CARL W. WERNER, a citizen of the United States, residing in Wakefield, in the county of Middlesex and State of Massachusetts, have invented a new and useful Attachment for Flower-Pots, of which the following is a specification.

It is common for flower-pots with their saucers to be inserted and kept in an ornamental vessel made of earthenware, basket-work, or other material, and usually termed a "jardinière." It is found difficult, however, to remove the pot with the plant growing in it from the jardinière, especially if the pot be large enough to contain a heavy quantity of earth, or if it is of such a size as to make it difficult or impossible for the fingers to be inserted between it and the jardinière.

My invention consists of a device which extends up from the saucer on opposite sides of the pot, whereby the pot with its contents may be easily lifted from its position, the handles of the lifting attachments being adapted when not in use to be folded down into the pot.

The nature of my invention is fully described in detail below and illustrated in the accompanying drawings, in which—

Figure 1:
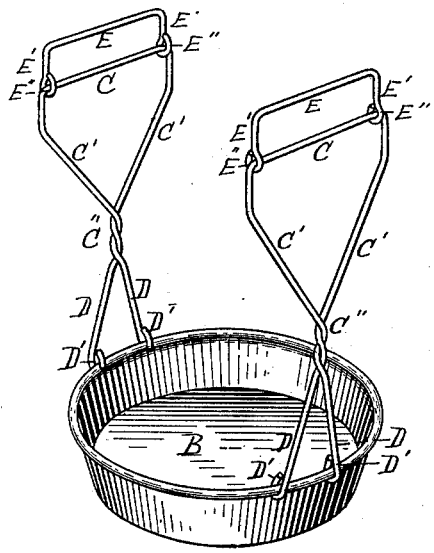
Figure 2:
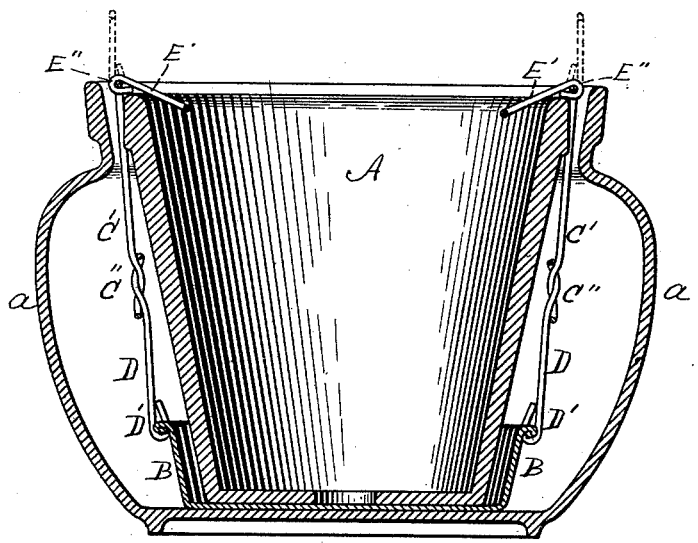

Figure 1 is a perspective view showing a flower-pot saucer provided with my attachments. Fig. 2 is a central vertical section taken through a flower-pot, its saucer, and a jardinière containing them, said saucer being provided with my attachments.

Similar letters of reference indicate corresponding parts.

A represents an ordinary earthenware flower-pot.

$a$ is a jardinière which may be of any style or shape.

B is the saucer, constructed preferably of metal—such as tin, for example. Secured to the upper edge, on opposite sides of this saucer, are two of my attachments. Each of these consists of a wire whose central portion C is horizontal and which is bent downward from the ends of said central portion into the two portions C', which are preferably twisted around each other at C'' in order to insure rigidity. From this point they spread into the diverging legs D, whose lower ends extend through suitable perforations in the saucer near its upper edge and are bent up into hooks D'. A handle or bail consisting of the preferably horizontal portion E and downwardly-bent portions E' hooks around the portion C by means of its bent ends E''. The whole constitutes a lifting device of which there are two exactly alike on opposite sides of the saucer. The main portion C C' D is long enough to extend from the saucer to the upper edge of the pot and allow the handle E E' to fold down into the pot, as indicated in Fig. 2. To lift the pot from the jardinière, swing up the handles into the position indicated in Fig. 2, and the saucer with the pot in it may be easily lifted out of its receptacle. The portions C' D may vary somewhat from the shape or configuration shown in the drawings, their essential function being to extend from the handle E at the upper edge of the pot down to the saucer to which their lower ends are secured.

Having thus fully described my invention, what I claim, and desire to secure by Letters Patent, is—

1. In combination with a flower-pot and its saucer B; a pair of lifting attachments each comprising a frame secured at its lower end to the saucer and extending up therefrom to the upper edge or mouth of the flower-pot, and handles secured to the upper ends of said frames, substantially as described.

2. In combination with a flower-pot and its saucer B; a pair of lifting attachments each comprising a frame secured at its lower end to the saucer and extending up therefrom to the upper edge or mouth of the flower-pot, and handles pivotally secured to the upper ends of said frames and adapted to swing inward and over the upper edge of the pot, substantially as set forth.

3. In combination with a flower-pot and its saucer B; a pair of lifting attachments each comprising a wire lifting-frame consisting of the upper substantially horizontal portion C located at the upper edge of the flower-pot, legs bent down from said portions and secured at their lower ends to the saucer, and the wire handles each consisting of the central portion E and downwardly-projecting portions E' the lower ends of the latter being hooked upon said portions C, substantially as described.

4. In combination with a flower-pot and its saucer B; the herein-described lifting attachments each comprising the wire lifting-frame consisting of the upper substantially horizontal portion C located at the upper edge of the flower-pot, the downwardly-extending legs each consisting of the pair of wires C' twisted around each other at C'' and spreading at their lower ends into the portions D which are secured to the saucer, and the wire handles E, E' swinging from said portions C and adapted to fold inward over the upper edge of the pot, substantially as described.

CARL W. WERNER.

Witnesses:
HENRY W. WILLIAMS,
A. N. BONNEY.